United States Patent
Gajdos

(10) Patent No.: US 11,819,973 B1
(45) Date of Patent: Nov. 21, 2023

(54) SELF-SERVICE ICE SKATE BLADE SHARPENING MACHINE

(71) Applicant: Dalibor Gajdos, Victoria (CA)

(72) Inventor: Dalibor Gajdos, Victoria (CA)

( * ) Notice: Subject to any disclaimer, the term of this patent is extended or adjusted under 35 U.S.C. 154(b) by 891 days.

(21) Appl. No.: 16/847,745

(22) Filed: Apr. 14, 2020

(51) Int. Cl.
*B24B 3/00* (2006.01)
*B24B 55/00* (2006.01)
*A63C 3/10* (2006.01)
*B24B 53/06* (2006.01)
*G07F 17/00* (2006.01)
*B24B 51/00* (2006.01)
*B24B 41/06* (2012.01)

(52) U.S. Cl.
CPC .............. *B24B 3/003* (2013.01); *A63C 3/10* (2013.01); *B24B 41/06* (2013.01); *B24B 51/00* (2013.01); *B24B 53/06* (2013.01); *B24B 55/00* (2013.01); *G07F 17/0014* (2013.01)

(58) Field of Classification Search
None
See application file for complete search history.

(56) References Cited

U.S. PATENT DOCUMENTS

| | | | |
|---|---|---|---|
| 2,486,850 A * | 11/1949 | Ives | B24B 3/003 125/11.03 |
| 3,008,275 A * | 11/1961 | Strickland, Jr. | B24B 5/36 451/283 |
| 3,735,533 A * | 5/1973 | Salberg | B24B 3/003 451/152 |
| 4,235,050 A * | 11/1980 | Hannaford | B24B 3/003 451/151 |
| 4,403,455 A | 9/1983 | Chiasson | |
| 5,287,657 A | 2/1994 | Tschida et al. | |
| 5,499,556 A | 3/1996 | Exner et al. | |
| 5,591,069 A | 1/1997 | Wurthman | |
| 5,897,428 A * | 4/1999 | Sakcriska | A63C 11/06 451/205 |
| 6,030,283 A | 2/2000 | Anderson | |
| 6,422,934 B1 | 7/2002 | Blach et al. | |
| 7,547,022 B2 | 6/2009 | Broadbent | |
| 7,934,978 B2 | 5/2011 | Wilson et al. | |
| 8,944,889 B2 | 2/2015 | Frommer et al. | |
| 9,669,508 B2 | 6/2017 | Layton, Jr. et al. | |
| 9,895,786 B2 | 2/2018 | Frommer et al. | |
| 10,065,282 B2 | 9/2018 | Layton, Jr. et al. | |
| 2016/0236315 A1 * | 8/2016 | Chuang | B24B 55/00 |

* cited by examiner

*Primary Examiner* — Hwei-Siu C Payer
(74) *Attorney, Agent, or Firm* — CRAMER PATENT & DESIGN, PLLC; Aaron R. Cramer

(57) ABSTRACT

An automated self-service machine for the selective sharpening of ice skate blades utilizes a pair of actuating mechanisms that operate a sharpening device. The sharpening device is disposed within a base and accessible only when activated. A user wearing the ice skate blade to be sharpened steps onto the base and inserts the ice skate blade within a slot where the sharpening blade resides. A control system is configured to enable a user to interface with it to provide the activation of the sharpening device and to enable financial transactions.

19 Claims, 6 Drawing Sheets

SELF-SERVICE ICE SKATE BLADE SHARPENING MACHINE

RELATED APPLICATIONS

Not applicable.

FIELD OF THE INVENTION

The present invention relates to a self-service machine for sharpening a blade of an ice skate.

BACKGROUND OF THE INVENTION

Among the wide variety of recreational sports that many people enjoy, ice-skating is at the top of the list. Whether part of hockey, figure skating, or just recreational skating, these activities are enjoyed by both young and old, providing entertainment and promoting physical fitness. In order to properly enjoy such a sport, it is imperative that one's skates are sharpened properly.

A skater can certainly sharpen their own skates, but it does require a fair amount of knowledge and tools. They can also take their skates to a professional ice skate sharpener who can provide the very best sharpening job; however, such a process is not only costly, but it requires a separate trip and takes the skates out of commission for days or more. Accordingly, there exists a need for a means by which ice skates can be easily and quickly sharpened at their point of use in an automated manner. The development of the automated ice skate sharpening device fulfills this need.

SUMMARY OF THE INVENTION

The principles of the present invention provide for an ice skate blade sharpening machine, comprises a base configured to receive a blade of an ice skate which is inserted in an opening disposed on the base whereupon the blade is automatically sharpened and a vertical section perpendicularly attached at a first end of the base. The vertical section supports an operating panel such that the operating panel is easily visible by a person. The machine also comprises a multi-level handrail which is provided on both sides of the base and the vertical section to allow the person to steady themselves with their hands and arms, a power cord which is connected to a conventional wall outlet to power the ice skate blade sharpening machine, a pair of blade clamp bars which receive the blade inserted through the opening and securing the blade in a center fixed position, a pair of first pneumatic actuators which move the pair of blade clamp bars moving along a first travel path, a pair of boot wedges which are provided on each end of the blade to facilitate holding the blade and the ice skate in place during sharpening and a pair of second pneumatic actuators which move the pair of boot wedges along a second travel path.

The machine also comprises a rotary grind wheel which moves along an entire length of the blade along a third travel path once the blade is fully secured by the pair of boot wedges, a moving carriage mounting the rotary grind wheel and which moves along the third travel path that is operated by a linear actuator bed, a grind wheel motor which imparts a rotary travel path to the rotary grind wheel, a payment device which accepts one or more forms of payment and a main microcontroller controlling the emergency stop button, the linear actuator motor, and the grind wheel motor.

The machine also comprises a blade clamp control valve which is actuated to open or close the pair of blade clamp bars; a boot wedge control valve which is actuated to open or close the pair of boot wedges and a compressed air source which provides pneumatic power which is routed to a first air regulator and a second air regulator. The regulated air pressure of the first air regulator is routed to the blade clamp control valve. When air pressure is switched to the first pair of pneumatic actuators and the regulated air pressure of the second air regulator is routed to the boot wedge control valve the air pressure is switched to the second pair of pneumatic actuators.

The opening may be centrally located on the base and may accept a plurality of blade lengths. The base may be thirty-six inches wide, thirty-six inches deep and four feet tall. The base may be made of aluminum. The operating panel may include an emergency stop button which removes all electrical power from the ice skate blade sharpening machine. The emergency stop button may be activated in the event of a malfunction of the ice skate blade sharpening machine that should disengage the blade clamp bars and the boot wedges that need to be disengaged before the sharpening process has completed as in when something accidentally becomes caught in the ice skate blade sharpening machine.

The operating panel may include a touch screen controller which may control the ice skate blade sharpening machine. The touch screen controller may control sharpening time and/or sharpening cycles. The touch screen controller may be upgradable with one or more new options. The multi-level handrail may be one size fits all. The machine may further comprise a linear actuator motor which provides rotary power to the linear actuator bed. The machine may also comprise a plurality of wiring providing electrical power to the linear actuator motor and the grind wheel motor. The machine may still further comprise a moving carriage which is provided with a spring pressure mechanism that keeps the rotary grind wheel in constant contact with the blade.

One or more forms of payment may be a payment method selected from the group consisting of a plurality of cash, a credit card, a debit card, or an electronic payment system payment. The payment device may be omitted where the ice skate blade sharpening machine is free. The machine may be a self-service ice skate blade sharpening machine. The self-service ice skate blade sharpening machine may automatically sharpen the pair of ice skates while they are worn.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
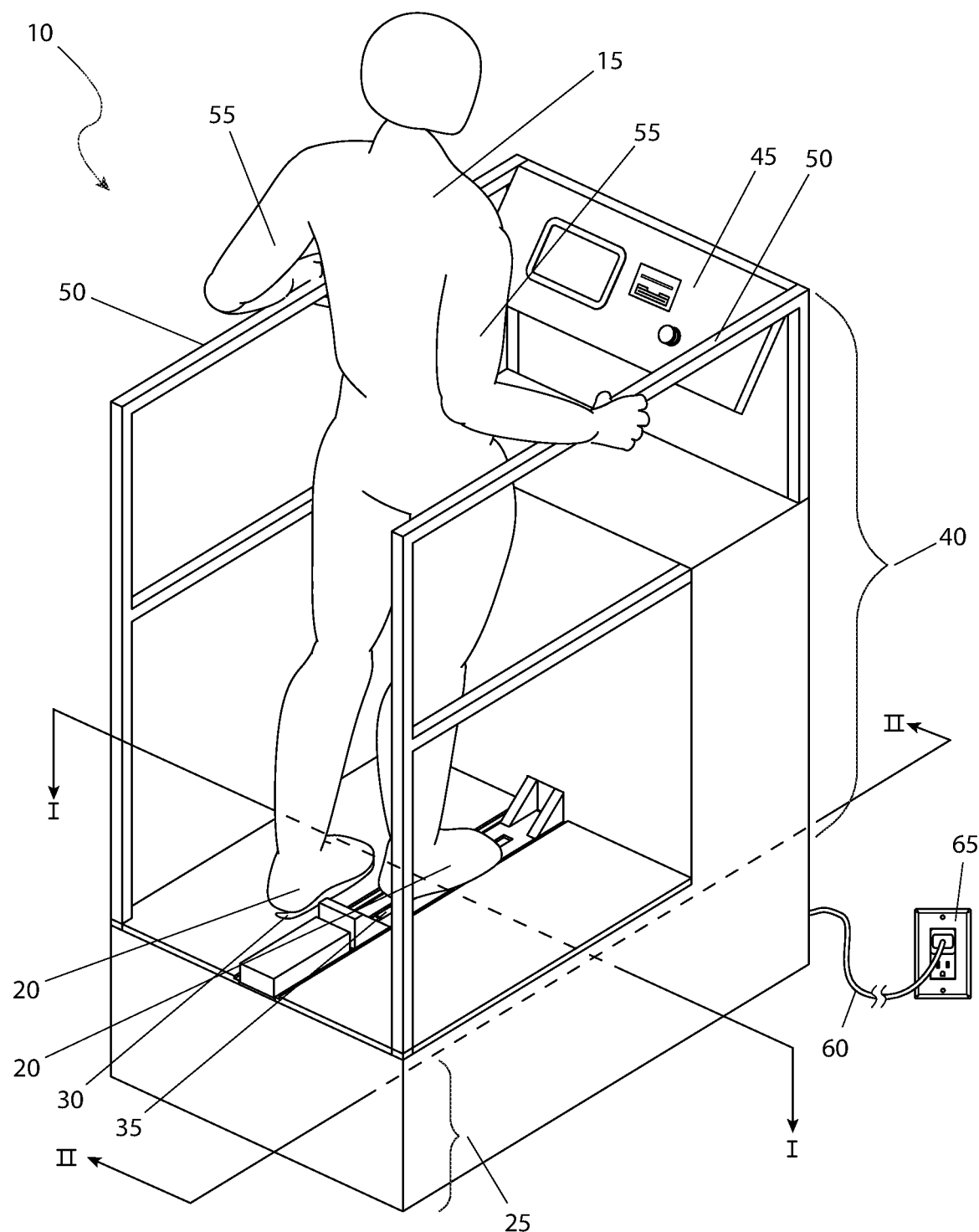
FIG. 1 is a perspective view of a self-service ice skate blade sharpening machine 10, shown in a utilized state, according to the preferred embodiment of the present invention.

DESCRIPTIVE KEY 10 self-service ice skate blade sharpening machine
15 user
20 ice skate
25 base section
30 blade
35 opening
40 vertical section
45 operating panel
50 handrail
55 hands and arms
60 power cord
65 conventional wall outlet
65 blade clamp bar
70 first travel path "1"
75 first pneumatic actuator
80 boot wedge
85 second travel path "2"
90 second pneumatic actuator
100 rotary grind wheel
105 third travel path
110 moving carriage
115 linear actuator bed
120 linear actuator motor
125 spring pressure mechanism
130 grind wheel motor
135 rotary travel path "r"
140 wiring
145 emergency stop button
160 power supply
165 main microcontroller
170 blade clamp control valve
175 boot wedge control valve
180 compressed air source
185 first air regulator
190 second air regulator 1. Description of the Invention The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

2. Detailed Description of the Figures

Referring now to FIG. 1, a perspective view of a self-service ice skate blade sharpening machine 10, shown in a utilized state, according to the preferred embodiment of the present invention is disclosed. The self-service ice skate blade sharpening machine 10 (herein also described as the "machine") 10, provides an automated method of sharpening ice skates while they are being worn. The user 15, wearing a pair of ice skates 20 stands upon a base 25 with the blade 30 of either the right or left ice skate 20 inserted in an opening 35 whereupon said blade 30 is automatically sharpened. Further description of the sharpening process will be described herein below. A vertical section 40 supports an operating panel 45 such that it is easily visible by the user 15. To facilitate use by user 15 of all ages and heights, a multi-level handrail 50 are provided on either side of the base section 25 and the vertical section 40 to allow the user 15 to steady themselves via their hands and arms 55. The machine 10 is powered by a power cord 60 connected to a conventional wall outlet 65. The base 25 has approximate dimensions of thirty-six inches (36 in.) wide, thirty-six inches (36 in.) deep and four feet (4 t.) tall, with the majority of the components made of aluminum.

Figure 2:
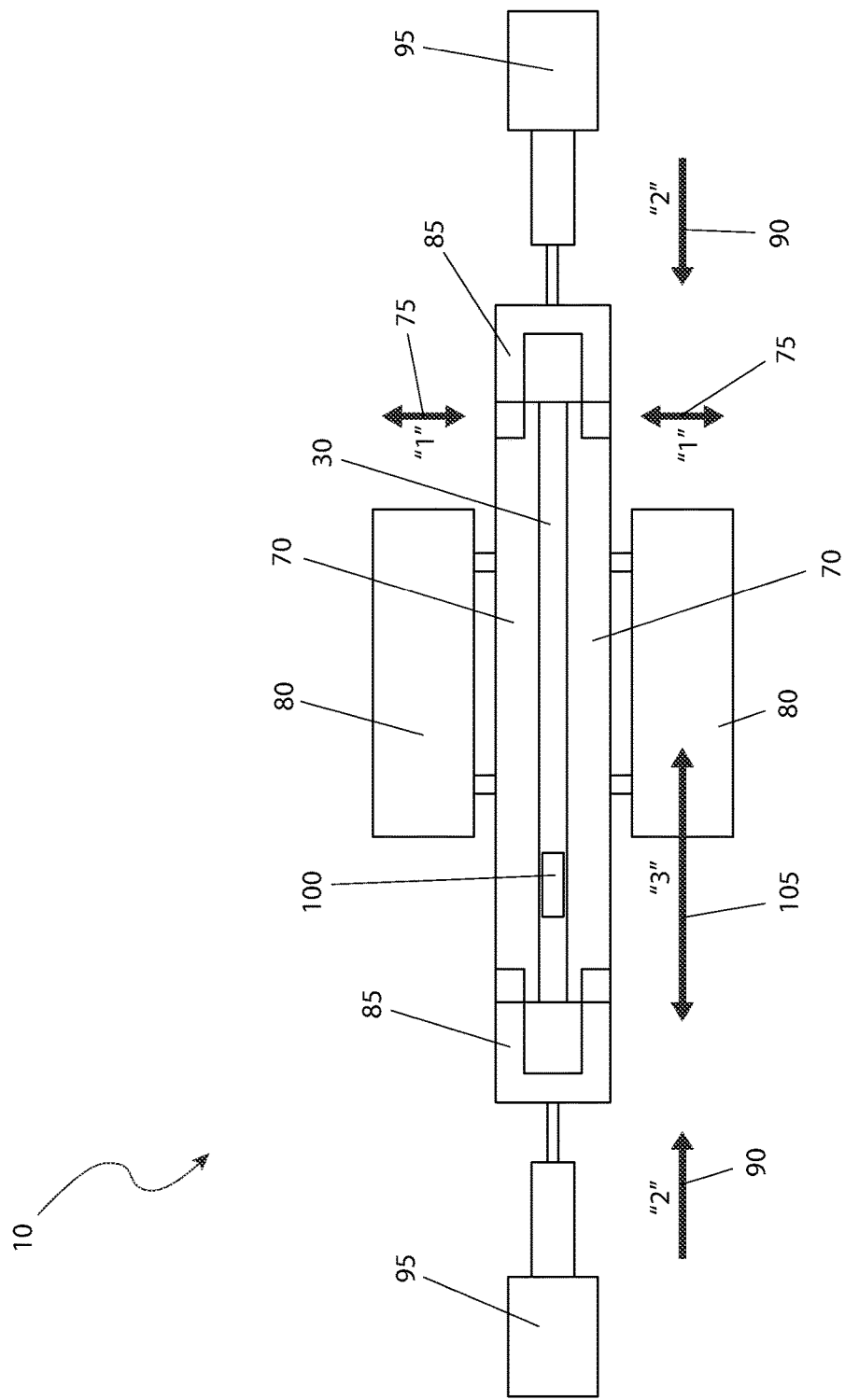
FIG. 2 is a sectional view of the self-service ice skate blade sharpening machine 10, as seen along a line I-I, as shown in FIG. 1, according to the preferred embodiment of the present invention.

Referring next to FIG. 2. a sectional view of the machine 10, as seen along a line I-I, as shown in FIG. 1, according to the preferred embodiment of the present invention is depicted. The opening 35 is centrally located and capable of accepting all lengths of blade 30 (as shown in FIG. 1). Once inserted, the blade 30 is secured in a center fixed position by two (2) blade clamp bars 70 that are moved along a first travel path "1" 75 by two (2) first pneumatic actuators 80. To further facilitate holding the blade 30 and the ice skate 20 (as shown in FIG. 1) in place during the sharpening process, two (2) boot wedges 85 are provide on each end of the blade 30. The boot wedges 85 move along a second travel path "2" 90 by two (2) second pneumatic actuators 95. Once fully secured, a rotary grind wheel 100 moves along the entire length of the blade 30 as defined by a third travel path 105.

Figure 3:
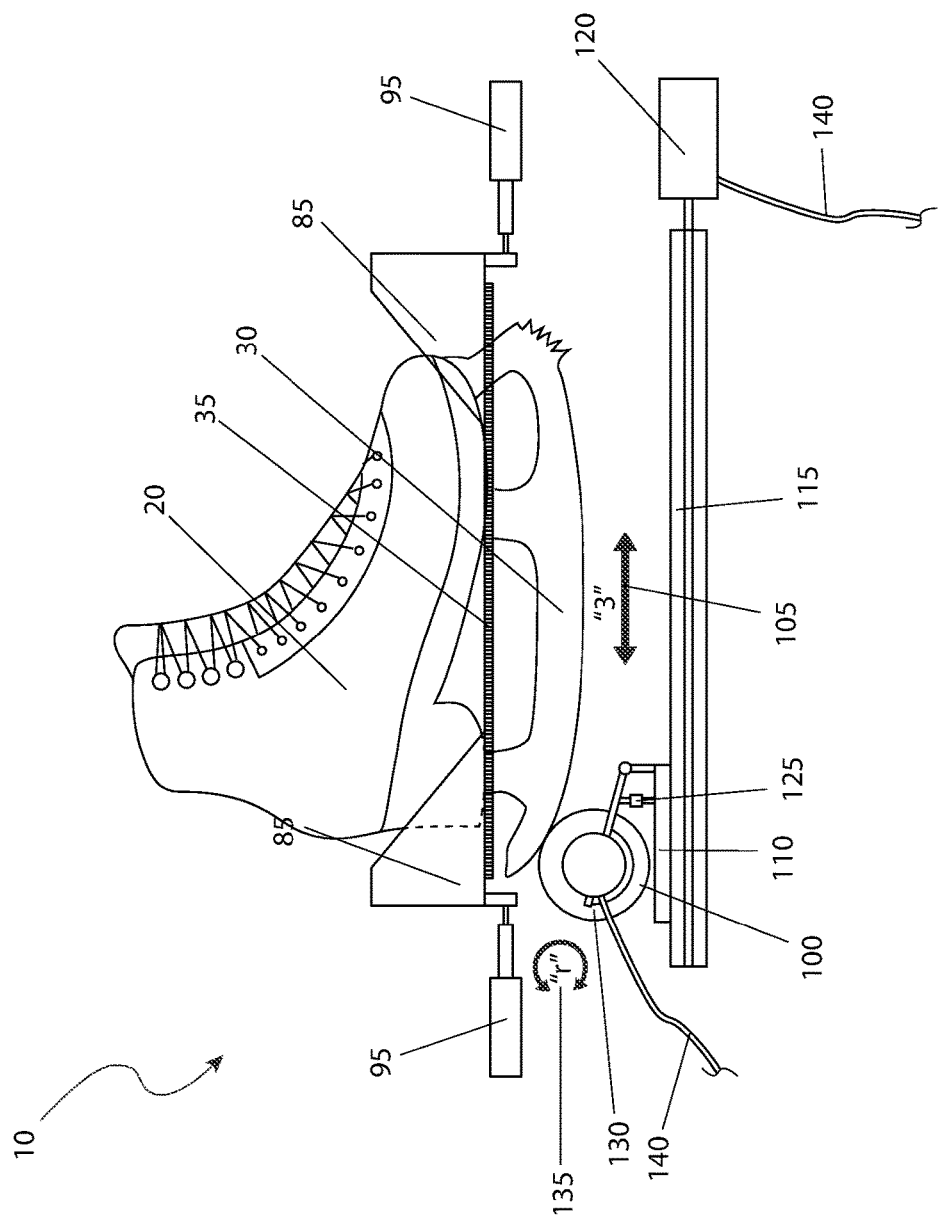
FIG. 3 is a sectional view of the self-service ice skate blade sharpening machine 10, as seen along a line II-II, as shown in FIG. 2, according to the preferred embodiment of the present invention.

Referring now to FIG. 3, a sectional view of the machine 10, as seen along a line II-II, as shown in FIG. 2, according to the preferred embodiment of the present invention is shown. The blade 30 of the ice skate 20 is inserted through the opening 35 while being worn by the user 15 (as shown in FIG. 1). The front and rear of the ice skate is secured by the boot wedges 85 as operated by the second pneumatic actuators 95. It is noted that the blade clamp bars 70 and the first pneumatic actuators 80 (as shown in FIG. 2) are not shown for purposes of illustrative clarity. The rotary grind wheel 100 is mounted on a moving carriage 110 which moves along the third travel path 105 as operated by a linear actuator bed 115. A linear actuator motor 120 provides the rotary power for the linear actuator bed 115. The moving carriage 110 is provided with a spring pressure mechanism 125 that keeps the rotary grind wheel 100 in constant contact with the blade 30. A grind wheel motor 130 imparts a rotary travel path "r" 135 to the rotary grind wheel 100. Wiring 140 provides electrical power to the linear actuator motor 120 and the grind wheel motor 130.

Figure 4:
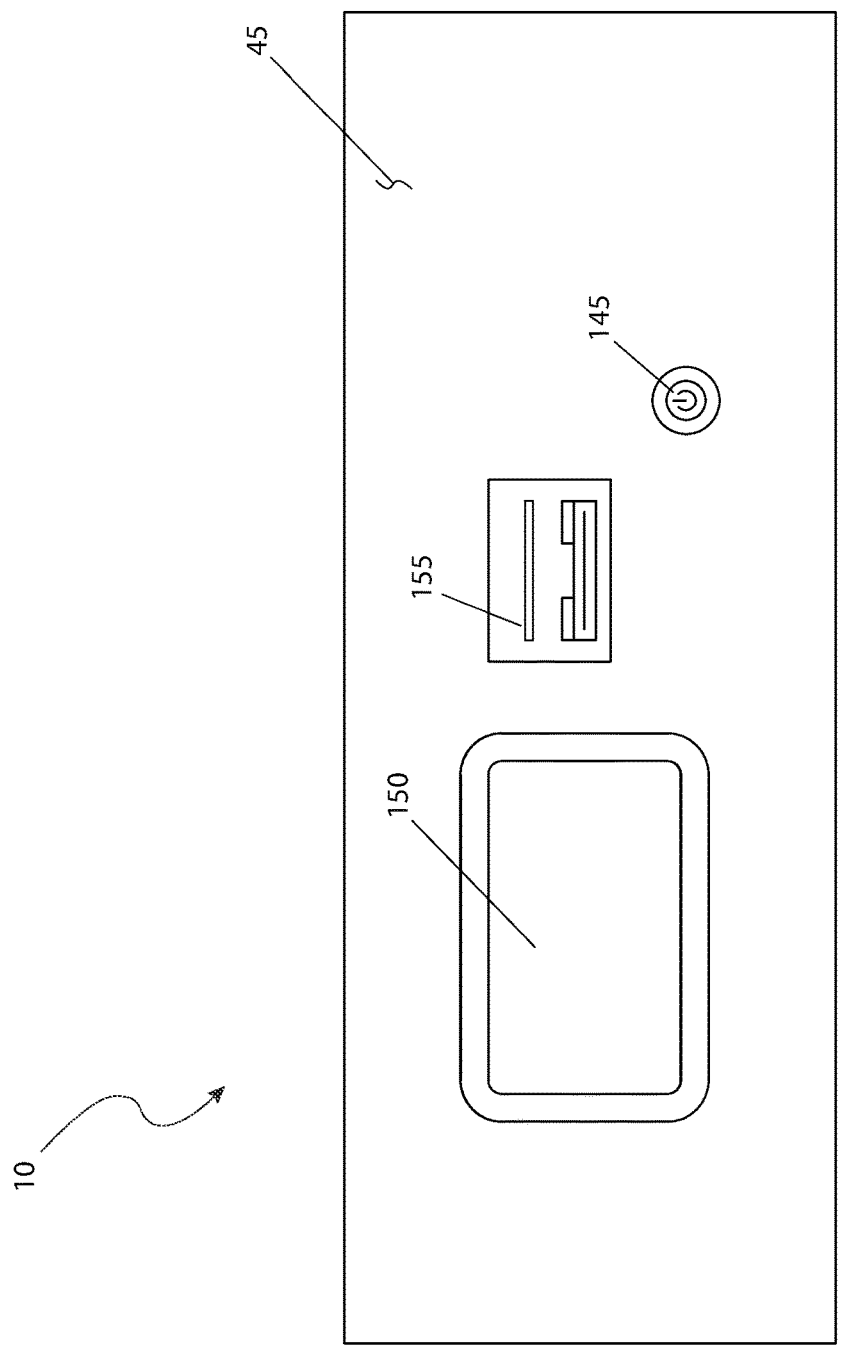
FIG. 4 is a front view of the operating panel 45 as used with the self-service ice skate blade sharpening machine 10, according to the preferred embodiment of the present invention.

Referring next to FIG. 4, a front view of the operating panel 45 as used with the machine 10, according to the preferred embodiment of the present invention is disclosed. The operating panel 45 is envisioned to provide for an emergency stop button 145 which removes all electrical power from the machine 10. It is envisioned that the emergency stop button 145 would be activated by the user 15 (as shown in FIG. 1) in the event of a malfunction of the machine 10, should the user need to disengage the blade clamp bars 70 and the boot wedges 85 (as shown in FIG. 2) before the sharpening process has completed, should pants or other clothing accidentally become caught in the machine 10. Also present on the operating panel 45 is a touch screen controller 150 which controls all operations of the machine 10 such as sharpening time, sharpening cycles, and the like. It is envisioned that the touch screen controller 150 could be upgradable with new or additional menu options over time. A payment device 155 is provided which accepts various forms of payment such as cash, credit cards, debit cards, electronic payment systems or the like. It is envisioned that the payment device 155 would be omitted in locations where the services provided by the machine are intended to be free, such as at skating schools, private residences, professional sporting events, private clubs, and the like.

Figure 5:
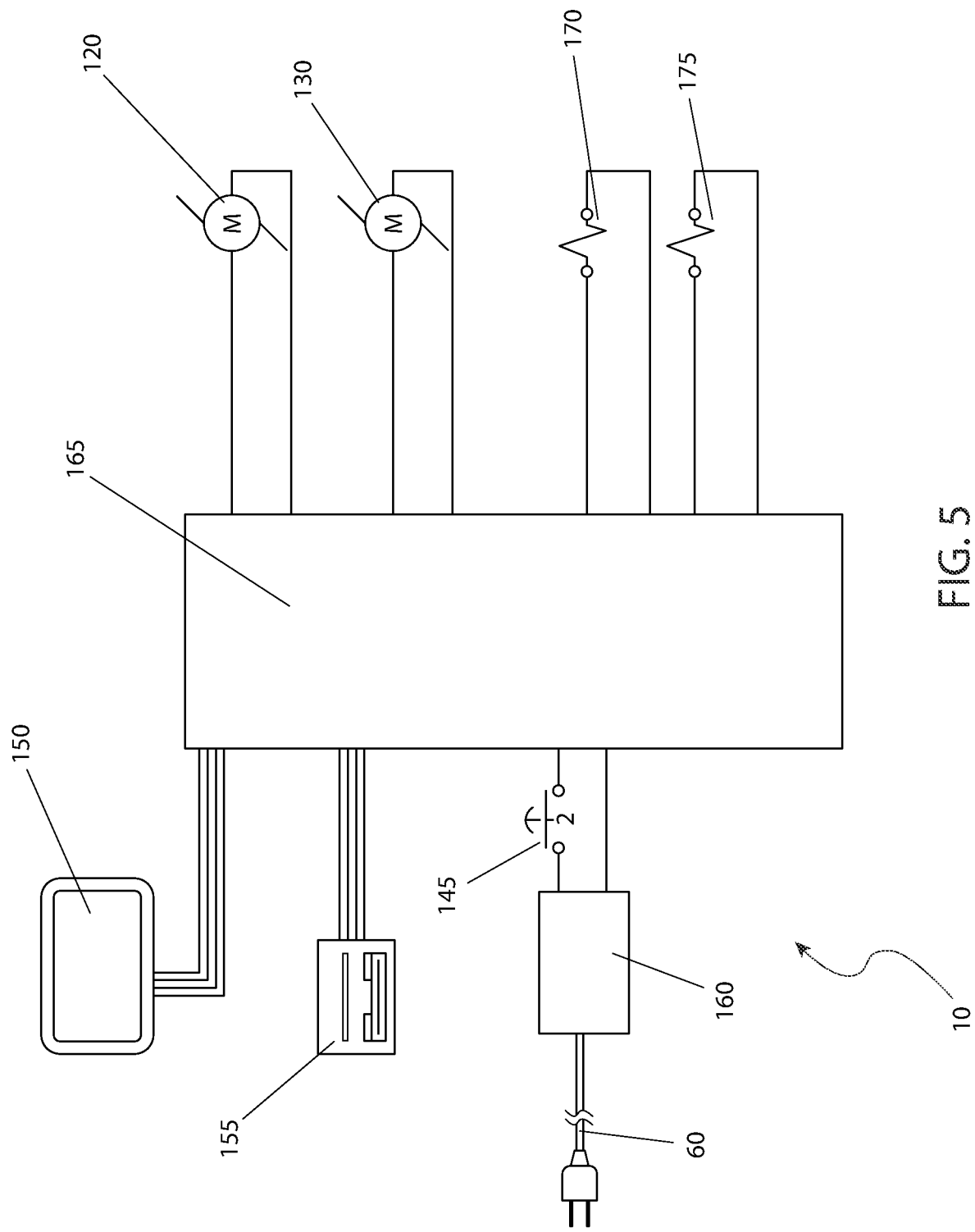
FIG. 5 is an electrical block diagram of the self-service ice skate blade sharpening machine 10, according to the preferred embodiment of the present invention; and, FIG. 6 is a pneumatic block diagram of the self-service ice skate blade sharpening machine 10, according to the preferred embodiment of the present invention.

Referring now to FIG. 5, an electrical block diagram of the machine 10, according to the preferred embodiment of the present invention is depicted. Electrical power for the machine 10 is provided via the power cord 60 which energizes a power supply 160. The emergency stop button 145 then control the resultant power as it enters a main microcontroller 165 such as a RaspberryPi®, an Arduino®, or other single board computer (SBC). The touch screen controller 150 and the payment device 155, if utilized, serve as inputs to the main microcontroller 165. The linear actuator motor 120 and the grind wheel motor 130 are energized by the main microcontroller 165 at the appropriate times during the operating cycle. A blade clamp control valve 170 and a boot wedge control valve 175 are also actuated at appropriate times to open or close their respective device.

Figure 6:
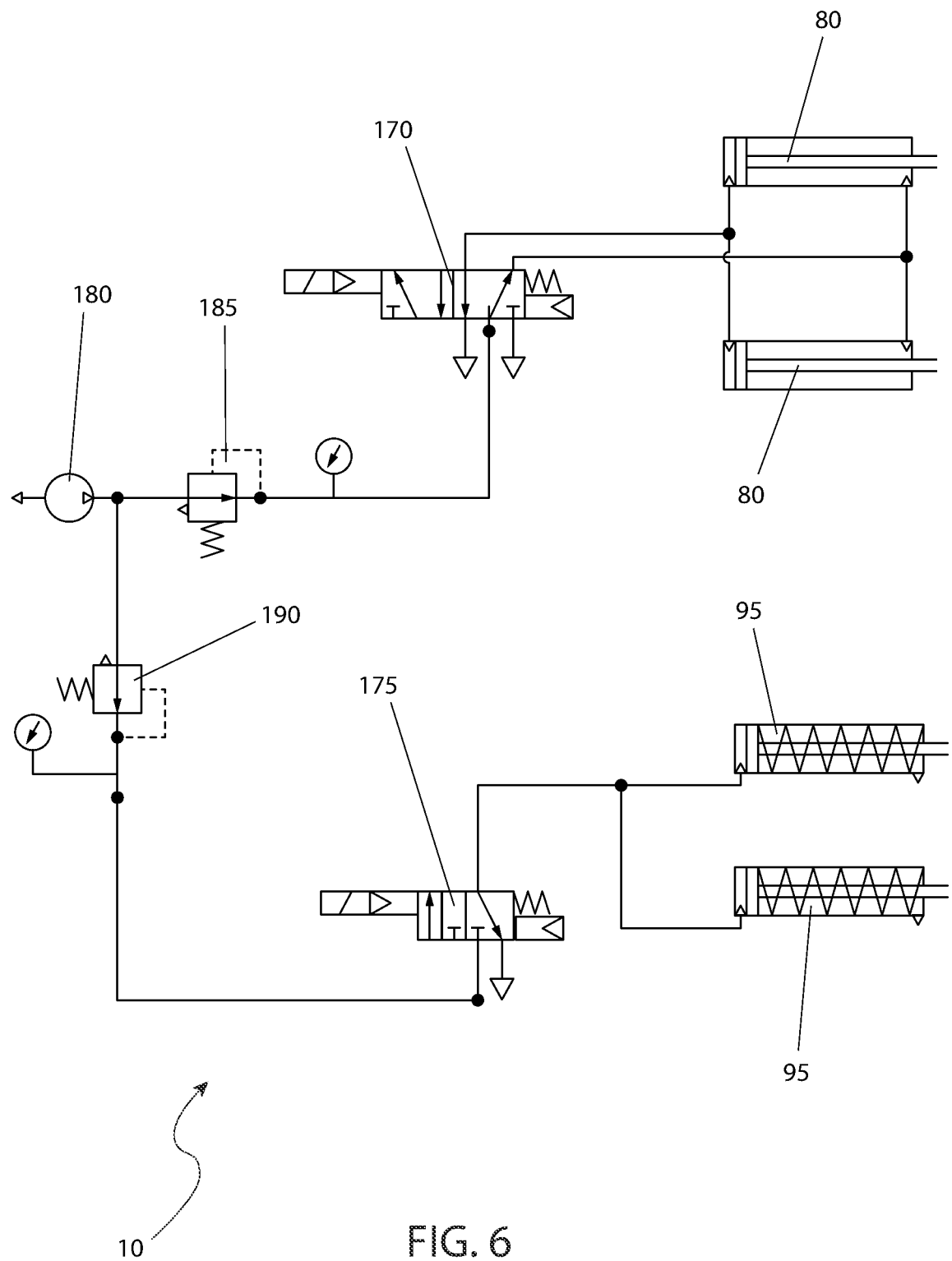

Referring finally to FIG. 6, a pneumatic block diagram of the machine 10, according to the preferred embodiment of the present invention is shown. A compressed air source 180 such as a compressor, either on board to the machine 10 or mounted exterior, provides pneumatic power to the machine 10. Air pressure is then routed to a first air regulator 185 and a second air regulator 190. The regulated air pressure of the first air regulator 185 is routed to the blade clamp control valve 170, where upon air pressure is switched to the first pneumatic actuators 80. Likewise, the regulated air pressure of the second air regulator 190 is routed to the boot wedge control valve 175, where upon air pressure is switched to the second pneumatic actuators 95.

3. Operation of the Preferred Embodiment

The preferred embodiment of the present invention can be utilized by the common user in a simple and effortless manner with little or no training. It is envisioned that the machine 10 would be constructed in general accordance with FIG. 1 through FIG. 6. The user would procure the machine 10 via conventional procurement channels such as sporting goods stores, commercial supply houses, mail order or internet stores or the like.

After procurement and prior to utilization, the machine 10 would be prepared in the following manner: the machine 10 would be deployed in a suitable location near an ice-skating rink or similar location and it would be connected to a power outlet 70 using the power cord 65.

During utilization of the machine 10, the following procedure would be initiated: the user 15, wearing their ice skates 20, would step upon the base 25 of the machine 10, and set either the right or left blade 30 into the opening 35; the appropriate payment would be tendered using the payment device 155 on the operating panel 45; the desired level and type of sharpening would be selected via the touch screen controller 150. The sharpening process would commence by securing the blade 30 using the blade clamp bars 70 and then the boot wedges 85; grinding action from the rotary grind wheel 100 upon the blades 30 as controlled from the main microcontroller 165; the main microcontroller 165 would drive the moving carriage 110 back and forth along the linear actuator bed 115 by controlling and reversing polarity to the linear actuator motor 120; upon completion, the blade clamp bars 70 and the boot wedges 85 are released; and status is indicated upon the touch screen controller 150 allowing the user 15 to step away to either sharpen the other ice skate 20 (right or left) or resume skating if both blades are sharpened.

After use of the machine 10, it automatically resets for use by the next user 15. Periodic replacement of the rotary grind wheel 100 is envisioned depending on frequency of usage.

Usage of the machine 10 is envisioned to provide the following benefits: near instantaneous sharpening of blades 30 at the point of use, elimination of transport of ice skates 20 to a professional ice skate sharpener, realization of highly accurate skate sharpening, little or no waiting times for skate sharpening, and the use of technology to enhance one's life.

What is claimed is:

1. An ice skate blade sharpening machine, comprising:
    a base receiving a blade of an ice skate inserted in an opening disposed on the base whereupon the blade is automatically sharpened;
    a vertical section perpendicularly attached at a first end of the base, the vertical section supporting an operating panel such that the operating panel is easily visible by a person;
    a multi-level handrail provided on both sides of the base and the vertical section to allow the person to steady themselves with their hands and arms;
    a power cord connected to a wall outlet to power the ice skate blade sharpening machine;
    a pair of blade clamp bars receiving the blade inserted through the opening and securing the blade in a center fixed position;
    a pair of first pneumatic actuators moving the pair of blade clamp bars moving along a first travel path;
    a pair of boot wedges provided on each end of the blade to facilitate holding the blade and the ice skate in place during sharpening;
    a pair of second pneumatic actuators moving the pair of boot wedges moving along a second travel path;
    a rotary grind wheel moving along an entire length of the blade along a third travel path once the blade is fully secured by the pair of boot wedges;
    a moving carriage mounting the rotary grind wheel which moves along the third travel path that is operated by a linear actuator bed;
    a grind wheel motor imparting a rotary travel path to the rotary grind wheel;
    a main microcontroller controlling the grind wheel motor;
    a blade clamp control valve actuated to open or close the pair of blade clamp bars; a boot wedge control valve actuated to open or close the pair of boot wedges; and a compressed air source providing pneumatic power routed to a first air regulator and a second air regulator, the regulated air pressure of the first air regulator is routed to the blade clamp control valve, where upon air pressure is switched to the pair of first pneumatic actuators and the regulated air pressure of the second air regulator is routed to the boot wedge control valve, where upon air pressure is switched to the pair of second pneumatic actuators.

2. The ice skate blade sharpening machine according to claim 1, wherein the opening is centrally located on the base.

3. The ice skate blade sharpening machine according to claim 1, wherein the opening accepts a plurality of blade lengths.

4. The ice skate blade sharpening machine according to claim 1, wherein the base is thirty-six inches wide, thirty-six inches deep and four feet tall.

5. The ice skate blade sharpening machine according to claim 1, wherein the base is made of aluminum.

6. The ice skate blade sharpening machine according to claim 1, wherein the operating panel includes an emergency stop button which stops all electrical power to the ice skate blade sharpening machine.

7. The ice skate blade sharpening machine according to claim 6, wherein the emergency stop button is activated in the event of a malfunction of the ice skate blade sharpening machine that should disengage the blade clamp bars and the boot wedges that need to be disengaged before the sharpening process has completed.

8. The ice skate blade sharpening machine according to claim 1, wherein the operating panel includes a touch screen controller which controls the ice skate blade sharpening machine.

9. The ice skate blade sharpening machine according to claim 8, wherein the touch screen controller controls sharpening time.

10. The ice skate blade sharpening machine according to claim 8, wherein the touch screen controller controls sharpening cycles.

11. The ice skate blade sharpening machine according to claim 8, wherein the touch screen controller is upgradable with one or more new options.

12. The ice skate blade sharpening machine according to claim 1, wherein the multi-level handrail is one size fits all.

13. The ice skate blade sharpening machine according to claim 1, further comprising a linear actuator motor providing rotary power to the linear actuator bed.

14. The ice skate blade sharpening machine according to claim 13, further comprising a plurality of wiring providing electrical power to the linear actuator motor and the grind wheel motor.

15. The ice skate blade sharpening machine according to claim 1, further comprising a moving carriage provided with a spring pressure mechanism that keeps the rotary grind wheel in constant contact with the blade.

16. The ice skate blade sharpening machine according to claim 1, further comprising a payment device which accepts one or more forms of payment.

17. The ice skate blade sharpening machine according to claim 16, wherein the one or more forms of payment is a payment method selected from the group consisting of a plurality of cash, a credit card, a debit card, or an electronic payment system payment.

18. The ice skate blade sharpening machine according to claim 1, wherein the ice skate blade sharpening machine is a self-service ice skate blade sharpening machine.

19. The ice skate blade sharpening machine according to claim 18, wherein the self-service ice skate blade sharpening machine further comprises an additional opening disposed on the base so that when a pair of ice states are worn, the blades of the ice skates are received in the openings and are automatically sharpened.

* * * * *